(12) United States Patent
Hwang

(10) Patent No.: US 9,479,738 B2
(45) Date of Patent: Oct. 25, 2016

(54) METHOD AND APPARATUS FOR TRANSMITTING AND RECEIVING BROADCASTING INFORMATION USING RESERVED CHANNELS

(75) Inventor: In-chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 960 days.

(21) Appl. No.: 11/938,410

(22) Filed: Nov. 12, 2007

(65) Prior Publication Data

US 2008/0229380 A1    Sep. 18, 2008

(30) Foreign Application Priority Data

Mar. 16, 2007    (KR) .......................... 10-2007-0026082

(51) Int. Cl.
| | | |
|---|---|---|
| G06F 3/00 | (2006.01) |
| G06F 13/00 | (2006.01) |
| H04N 5/445 | (2011.01) |
| H04N 7/173 | (2011.01) |
| H04N 21/262 | (2011.01) |
| H04N 21/458 | (2011.01) |

(52) U.S. Cl.
CPC .... *H04N 7/17318* (2013.01); *H04N 21/26283* (2013.01); *H04N 21/26291* (2013.01); *H04N 21/4586* (2013.01)

(58) Field of Classification Search
CPC ..................... H04N 21/23109; H04N 21/235; H04N 21/23614; H04N 21/25825; H04N 21/431
USPC ............................................... 725/48–50, 54
See application file for complete search history.

(56) References Cited

U.S. PATENT DOCUMENTS

| | | | | |
|---|---|---|---|---|
| 5,801,753 | A | * | 9/1998 | Eyer et al. ...................... 725/50 |
| 5,841,433 | A | * | 11/1998 | Chaney .......................... 725/50 |
| 5,956,455 | A | * | 9/1999 | Hennig ......................... 386/245 |
| 5,973,683 | A | * | 10/1999 | Cragun et al. ................ 715/719 |
| 6,173,330 | B1 | * | 1/2001 | Guo et al. ..................... 709/232 |
| 6,252,629 | B1 | | 6/2001 | Takatori |
| 6,271,893 | B1 | * | 8/2001 | Kawaguchi et al. ......... 348/725 |
| 6,405,372 | B1 | * | 6/2002 | Kim et al. ....................... 725/50 |
| 6,549,718 | B1 | * | 4/2003 | Grooters et al. ............. 386/291 |
| 6,901,603 | B2 | * | 5/2005 | Zeidler et al. .................. 725/39 |
| 6,978,471 | B1 | * | 12/2005 | Klopfenstein .................. 725/50 |

(Continued)

FOREIGN PATENT DOCUMENTS

| | | |
|---|---|---|
| JP | 2005-318059 A | 11/2005 |
| JP | 2006186443 A | 7/2006 |

(Continued)

OTHER PUBLICATIONS

Communication, dated Jul. 24, 2013, issued by the Korean Patent Office in counterpart Korean Application No. 10-2007-0026082.

*Primary Examiner* — Jason Salce
(74) *Attorney, Agent, or Firm* — Sughrue Mion, PLLC

(57) ABSTRACT

Disclosed are a method and apparatus for transmitting and receiving broadcasting information. A method of receiving broadcasting information using reserved channels according to an aspect of the present invention includes receiving information of a program schedule that includes a dynamic program having a flexible broadcasting schedule, searching one or more reserved channels that receive broadcasting signals according to a new program schedule changed due to the dynamic program, and receiving the broadcasting signals through the one or more searched reserved channels.

26 Claims, 4 Drawing Sheets

(56) References Cited

U.S. PATENT DOCUMENTS

| | | | |
|---|---|---|---|
| 6,996,627 B1* | 2/2006 | Carden | 709/237 |
| 7,631,333 B2* | 12/2009 | Kobayashi | 725/50 |
| 7,650,423 B2* | 1/2010 | Carden | 709/237 |
| 2002/0073424 A1* | 6/2002 | Ward et al. | 725/42 |
| 2002/0138845 A1* | 9/2002 | Hoang | 725/90 |
| 2003/0126610 A1* | 7/2003 | Ando | 725/91 |
| 2003/0135856 A1* | 7/2003 | Hancock et al. | 725/50 |
| 2003/0163812 A1* | 8/2003 | Tsukamoto et al. | 725/39 |
| 2006/0150230 A1* | 7/2006 | Chung et al. | 725/118 |
| 2008/0066103 A1* | 3/2008 | Ellis et al. | 725/38 |
| 2008/0307460 A1* | 12/2008 | Knudson et al. | 725/50 |
| 2009/0119703 A1* | 5/2009 | Piepenbrink et al. | 725/34 |

FOREIGN PATENT DOCUMENTS

| | | |
|---|---|---|
| KR | 10-1999-0052306 A | 7/1999 |
| KR | 10-2003-0067953 A | 8/2003 |
| KR | 1020060080114 A | 7/2006 |

* cited by examiner

METHOD AND APPARATUS FOR TRANSMITTING AND RECEIVING BROADCASTING INFORMATION USING RESERVED CHANNELS

CROSS REFERENCE TO RELATED APPLICATION

This application claims priority from Korean Patent Application No. 10-2007-0026082 filed on Mar. 16, 2007, in the Korean Intellectual Property Office, the disclosure of which is incorporated herein by reference in its entirety.

BACKGROUND OF THE INVENTION

1. Field of the Invention

Methods and apparatuses consistent with the present invention relate to transmitting and receiving broadcasting information. More particularly, the present invention relates to transmitting and receiving broadcasting information using reserved channels that are capable of setting, i.e., selecting, a reserved channel separated from a currently broadcasted channel to make preparation for a case where a broadcasting program schedule determined by a broadcasting station is changed and transmitting and receiving a broadcasting signal according to a changed program schedule.

2. Description of the Related Art

While viewers view a broadcasting show, such as terrestrial broadcasting, cable broadcasting, or satellite broadcasting, the viewers do not view prerecorded broadcasting but live broadcasting, such as sport games or breaking news, which relays in real time. When a sport game that is telecasting live does not end at a scheduled time and continuously progresses or breaking news that is not scheduled needs to be broadcasted, regardless of a broadcasting program schedule that is previously determined by a server of a broadcasting station, the broadcasting program schedule may be changed.

In these cases, two methods have been used. According to a first method, a program that is currently broadcasted live is continuously broadcasted, while a program scheduled for being subsequent to the current program is postponed or cancelled. According to a second method, after a program that is currently broadcasted live is terminated according to an original broadcasting program schedule, the next program is broadcasted.

However, even though one of the two methods is selected, viewers who prefer the other method rather than one selected method complain about the selected method. After all, the viewers have no choice but to follow a policy that is determined by a broadcasting station that transmits broadcasting.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the of the present invention provide a method and apparatus for transmitting and receiving broadcasting information using reserved channels that are capable of setting one or more reserved channels and receiving broadcasting signals according to a changed program schedule and an original program schedule, when there generated a change in a program schedule that includes a dynamic program having a flexible, i.e., changing, broadcasting schedule.

Aspects of the present invention are not limited to the above-mentioned aspects, and other aspects of the present invention will be apparently understood by those skilled in the art through the following description.

According to a first aspect of the present invention, there is provided a method of receiving broadcasting information using reserved channels, the method including receiving information of a program schedule that includes a dynamic program having a flexible broadcasting schedule, searching one or more reserved channels that receive broadcasting signals according to a new program schedule changed due to the dynamic program, and receiving the broadcasting signals through the one or more searched reserved channels.

According to a second aspect of the present invention, there is provided a method of transmitting broadcasting information using reserved channels, the method including creating a program schedule that includes a dynamic program having a flexible broadcasting schedule, setting one or more reserved channels that transmit broadcasting signals according to a new program schedule changed due to the dynamic program, and causing the broadcasting signals to be transmitted to a broadcasting receiver through the one or more set reserved channels.

According to a third aspect of the present invention, there is provided an apparatus for receiving broadcasting information using reserved channels, the apparatus including a transmitting and receiving unit receiving information of a program schedule that includes a dynamic program having a flexible broadcasting schedule, and a channel searching unit searching one or more reserved channels that receive broadcasting signals according to a new program schedule changed due to the dynamic program. The transmitting and receiving unit receives the broadcasting signals through the one or more searched reserved channels.

According to a fourth aspect of the present invention, there is provided a system for transmitting and receiving broadcasting information using reserved channels, the system including a broadcasting station server setting, when there is a change in a program schedule that includes a dynamic program having a flexible broadcasting schedule, one or more reserved channels, and transmitting broadcasting signals according to the changed program schedule, and a broadcasting receiver receiving the broadcasting signals through the one or more reserved channels that receive the broadcasting signals.

According to a fifth aspect of the present invention, there is provided a computer recordable recording medium including a program code that is executed by a computer in order to execute a method of receiving broadcasting information using reserved channels, the method including receiving information of a program schedule that includes a dynamic program having a flexible broadcasting schedule, searching one or more reserved channels that receive broadcasting signals according to a new program schedule changed due to the dynamic program, and receiving the broadcasting signals through the one or more searched reserved channels.

According to a sixth aspect of the present invention, there is provided a computer recordable recording medium including a program code that is executed by a computer in order to execute a method of transmitting broadcasting information using reserved channels, the method including creating a program schedule that includes a dynamic program having a flexible broadcasting schedule, setting one or more reserved channels that transmit broadcasting signals according to a new program schedule changed due to the dynamic program, and causing the broadcasting signals to be transmitted to a broadcasting receiver through the one or more set reserved channels.

BRIEF DESCRIPTION OF THE DRAWINGS

The above and other features and advantages of the present invention will become more apparent by describing in detail exemplary embodiments thereof with reference to the attached drawings in which.

DESCRIPTION OF THE EXEMPLARY EMBODIMENTS

Figure 1:
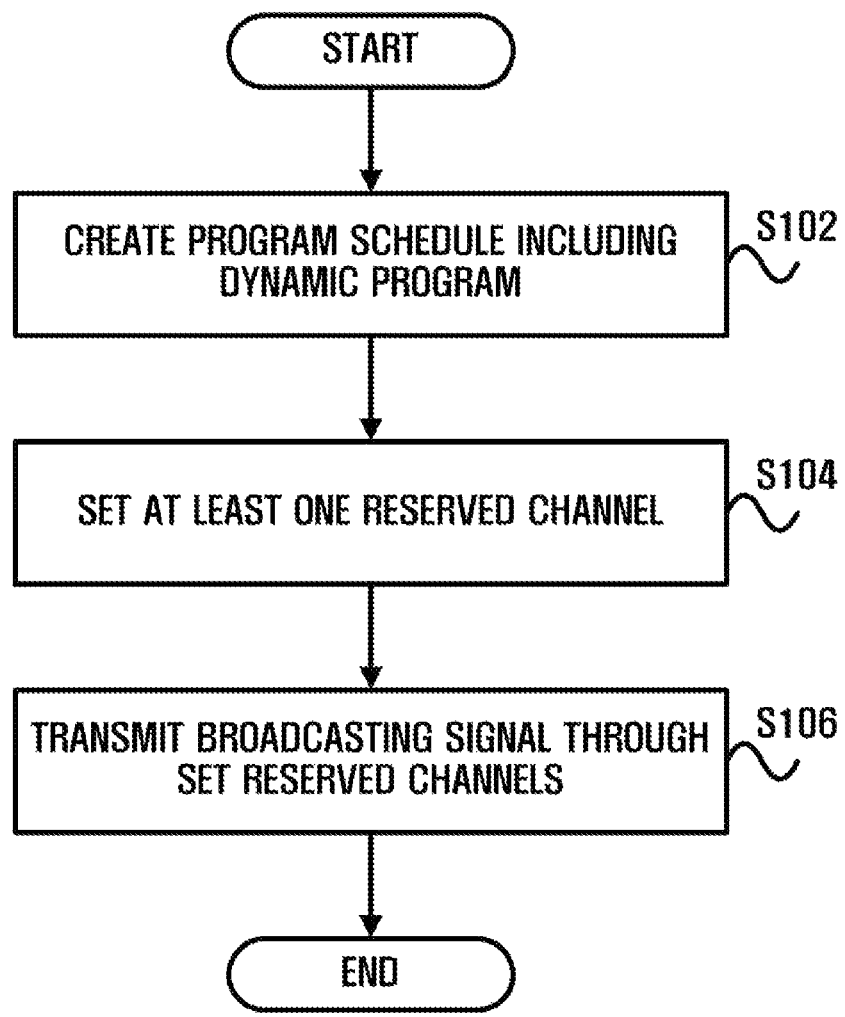
FIG. 1 is a flowchart illustrating a method of transmitting broadcasting information using reserved channels according to an exemplary embodiment of the present invention.

Advantages and features of the present invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

The exemplary embodiments of the present invention will now be described more fully with reference to the accompanying drawings, in which exemplary embodiments of the present invention are shown.

The exemplary embodiments of the present invention that will be described below can be applied to any type of broadcasting systems. That is, the exemplary embodiments may also be applied to data broadcasting services including data broadcasting services that are provided by a digital TV (hereinafter, referred to as DTV), an Internet protocol TV (hereinafter, referred to as IPTV), or the like.

FIG. 1 is a flowchart illustrating a method of transmitting broadcasting information using reserved channels according to an exemplary embodiment of the present invention.

A plurality of broadcast programs that constitute a program schedule include programs that are scheduled for live broadcasting or broadcasted as a news flash during regular broadcasting. In this case, among the plurality of programs, programs, of which broadcasting start time and broadcasting end time are not constant or broadcasting time is not determined, are referred to as "dynamic programs". First, a broadcasting station that transmits broadcasting signals creates a program schedule that includes the dynamic programs (Operation S102). In this case, in the dynamic programs, at least one of a program start time, a program end time, a program broadcasting time, and a program broadcasting order is flexible. A broadcasting station server may previously store information indicating that the program schedule may be changed by the dynamic programs as the program schedule information or the dynamic program information.

When the program schedule that is previously determined is changed due to the dynamic programs, that is, when live broadcasting previously scheduled is continuously broadcasted more than a predetermined time allotted or a news flash needs to be broadcasted, it is required to set one or more reserved channels that can transmit broadcasting signals according to a newly changed program schedule (Operation S104). The broadcasting station server should store additional information when the reserved channels are set are and transmit the corresponding information to a broadcasting receiver. The information on the reserved channels includes channel number information or resolution information of the reserved channels, and may be simultaneously transmitted together with the broadcasting signals or separately transmitted.

In a next operation, broadcasting signals according to the changed program schedule are transmitted to the broadcasting receiver through the set reserved channels (Operation S106). Of course, the broadcasting signals according to the original program schedule before being changed are transmitted through the original channels. In contrast, the broadcasting signals according to the program schedule after being changed are transmitted through the original channels, and the broadcasting signals according to the program schedule before being changed may be transmitted through the reserved channels.

A method of setting the reserved channels will now be described.

Figure 3:
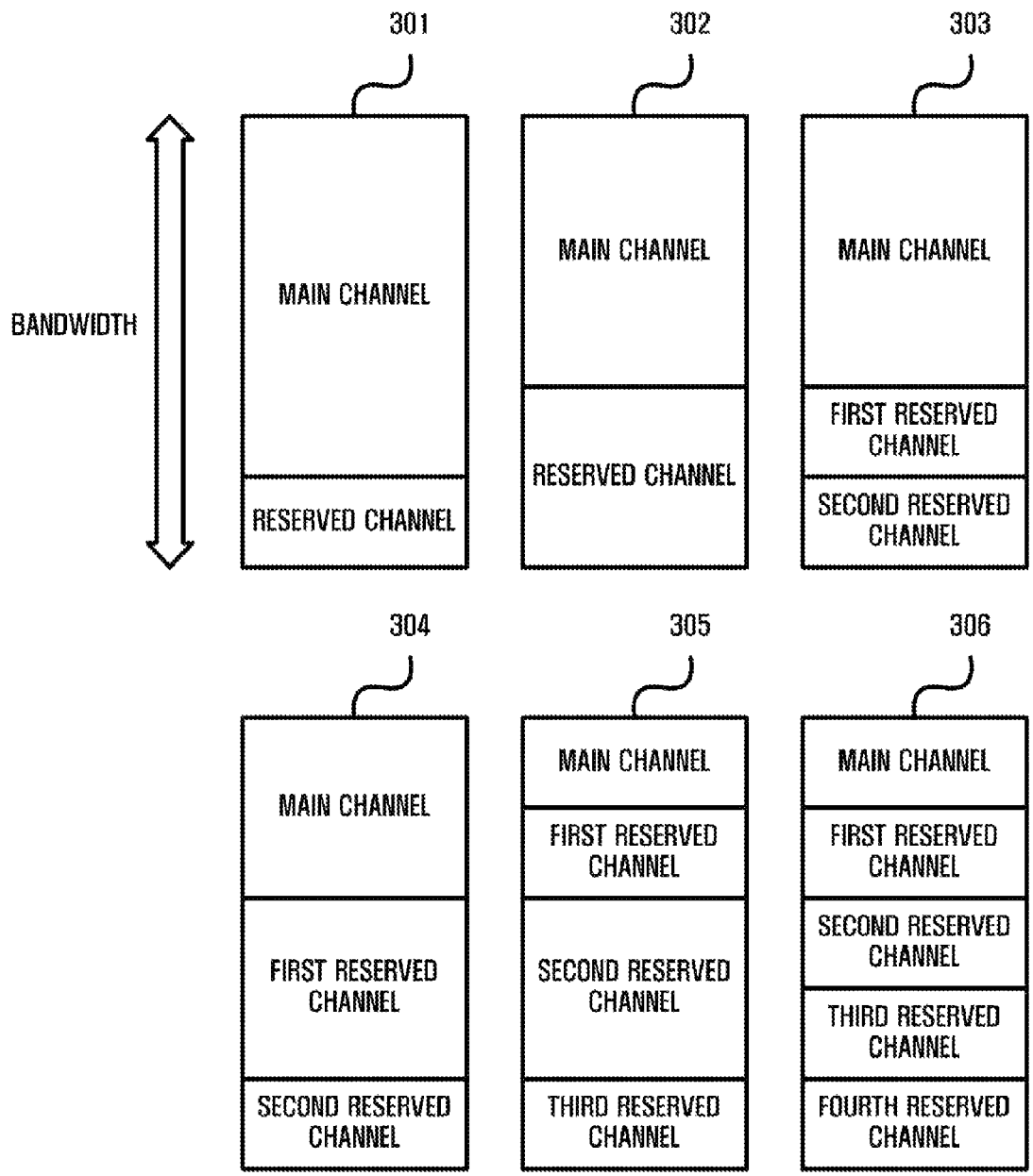
FIG. 3 is a diagram illustrating a process of creating a reserved channel by dividing a frequency bandwidth according to an exemplary embodiment of the present invention.

First, a multi-mode service (MMS) scheme will be described with reference to FIG. 3. FIG. 3 is a diagram illustrating a course of creating reserved channels by dividing a frequency bandwidth according to an exemplary embodiment of the present invention. The multi-mode service is also called multicasting, and means that a plurality of channels are created from a frequency bandwidth assigned to one channel and broadcasting signals are transmitted therethrough. According to the multi-mode service scheme, by using a remaining bandwidth after transmitting one HD channel within a frequency bandwidth that is assigned to one channel of digital broadcasting, an SD video channel, an audio channel, a data channel, or the like may be transmitted.

In the exemplary embodiment of the present invention, a frequency bandwidth that is assigned to a main channel, through which the broadcasting signals according to the original program schedule before being changed are transmitted, are divided by using the multi-mode service scheme, a portion of the frequency bandwidth is used as a bandwidth of the main channel, and the other portion may be used as bandwidths of reserved channels. If it is assumed that a total bandwidth is 5 MHz in FIG. 3, the total bandwidth may be divided in such a manner that a bandwidth of 4 MHz is assigned to the main channel and a bandwidth of 1 MHz is assigned to the reserved channel (Operation S301), or that a bandwidth of 3 MHz is assigned to the main channel and a bandwidth of 2 MHz is assigned to the reserved channel (Operation S302). Alternatively, the total bandwidth may be divided in such a manner that a bandwidth of 3 MHz is assigned to the main channel, and a bandwidth of 1 MHz is assigned to each of the first and second reserved channels (Operation S303), or that a bandwidth of 2 MHz is assigned to the main channel, a bandwidth of 2 MHz is assigned to the first reserved channel, and a bandwidth of 1 MHz is assigned to the second reserved channel (Operation S304). Alternatively, the total bandwidth may be divided in such a manner that a bandwidth of 1 MHz is assigned to each of the main channel and the first reserved channel, a bandwidth of 2 MHz is assigned to the second reserved channel, and a bandwidth of 1 MHz is assigned to a third reserved channel (Operation S305), or that a bandwidth of 1 MHz is assigned to each of the main channel, the first reserved channel, the second reserved channel, the third reserved channel, and the fourth reserved channel (Operation S306).

Another method of setting reserved channels is a method of creating reserved channels by securing a plurality of IP addresses, and can be mainly applied to an Internet protocol television (hereinafter, referred to as IPTV). In this case, the IP addresses may be pure multicast IP addresses, and may be IP addresses to download contents from a channel using a Video On Demand (VOD) service or a channel from which contents can be downloaded and reproduce the contents. These IP addresses should be secured from the broadcasting station server. The VOD service is a service that provides image information requested by a user in real time. The VOD service is an interactive service in which a program is not unilaterally received through existing public network broadcasting or a cable TV but a subscriber can use desired contents at desired time. The IPTV is often used to provide the VOD service. Using a TV receiver, the IPTV provides information services, motion picture contents, and broadcasting as interactive television services that are provided using a high-speed Internet network. The IPTV that has the characteristic of a fusion between the Internet and the TV uses a TV receiver instead of a computer monitor, enables interactive communication, and allows viewers to view desired programs at desired times.

Figure 2:
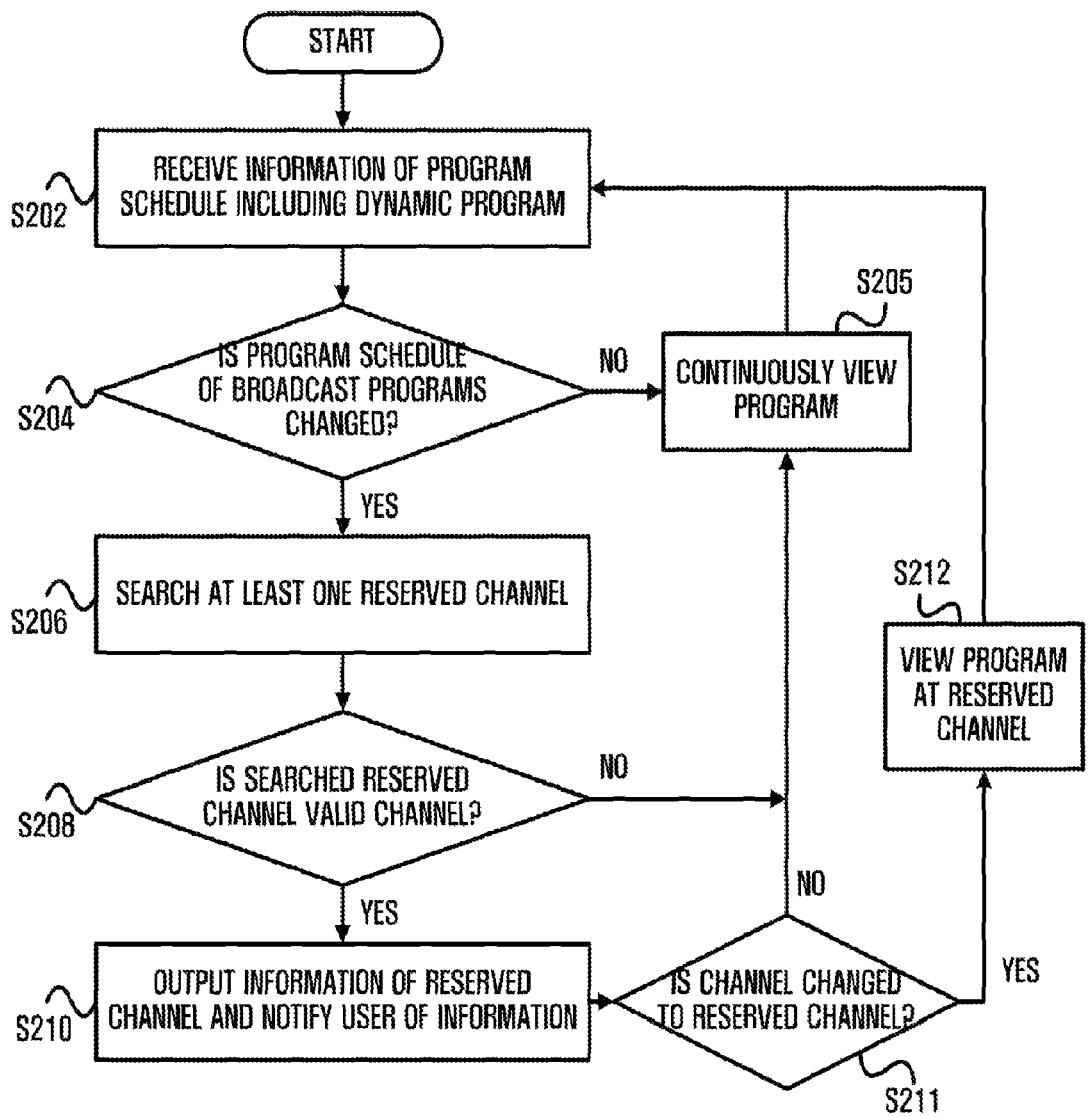
FIG. 2 is a flowchart illustrating a method of receiving broadcasting information using reserved channels according to an exemplary embodiment of the present invention.

FIG. 2 is a flowchart illustrating a method of receiving broadcasting information using reserved channels according to an exemplary embodiment of the present invention.

First, the broadcasting receiver receives information of a program schedule that includes dynamic programs transmitted by the broadcasting station server (Operation S202). Further, the broadcasting receiver can receive additional information when the reserved channels are set by the broadcasting station server. As described with reference to FIG. 1, the dynamic program is a program in which one of a program start time, a program end time, a program broadcasting time, and a program broadcasting order is flexible and which affects a program broadcasting order or program broadcasting time after the corresponding program ends.

Then, the broadcasting receiver side determines whether a program is currently broadcasted according to the changed program schedule or the program is currently broadcasted according to the original program schedule, on the basis of information of the program schedule (Operation S204). If the program schedule is not changed and the program is broadcasted according to the original program schedule, the viewers can continuously view the corresponding program (Operation S205). However, if the program schedule is changed due to the dynamic program, the broadcasting receiver side searches for one or more reserved channels that can receive broadcasting signals according to a new program schedule (Operation S206).

It is determined whether one or more reserved channels, which are created by dividing a frequency bandwidth or securing a plurality of IP addresses, are currently valid channels (Operation S208). When it is determined that the one or more reserved channels are invalid channels, the user continuously views the currently viewed program (Operation S205), and when it is determined that the one or more reserved channels are valid channels, the broadcasting receiver side outputs the information of the reserved channels to a screen so as to notify the user of the information through a pop-up function or Picture In Picture (PIP) function (Operation S210). In this case, the information of the reserved channels includes not only information of the reserved channels, such as channel numbers or resolution of the reserved channels, but also information of broadcast programs that are displayed on the reserved channels. For example, programs that are broadcasted through the reserved channels (programs according to the changed schedule) can be displayed on a screen at the current channel by using a pop-up window or a PIP function. Further, a message like "a program currently broadcasted at a reserved channel of 11.1 is being broadcasted ten minutes later than the original scheduled time" can be displayed through a script.

The user determines on the basis of the notification whether or not to change the channel to the reserved channel (Operation S211), and when the user does not change the channel to the reserved channel, the user continuously views the original program (Operation S205), and when the user changes the channel to the reserved channel, the user receives broadcasting signals according to the changed program schedule through the reserved channel and views a changed program (Operation S212). However, the user may receive the broadcasting signals according to the changed program schedule through the original channel and view a program, and may receive the broadcasting signals according to the original program schedule through the reserved channel and view a program.

Figure 4:
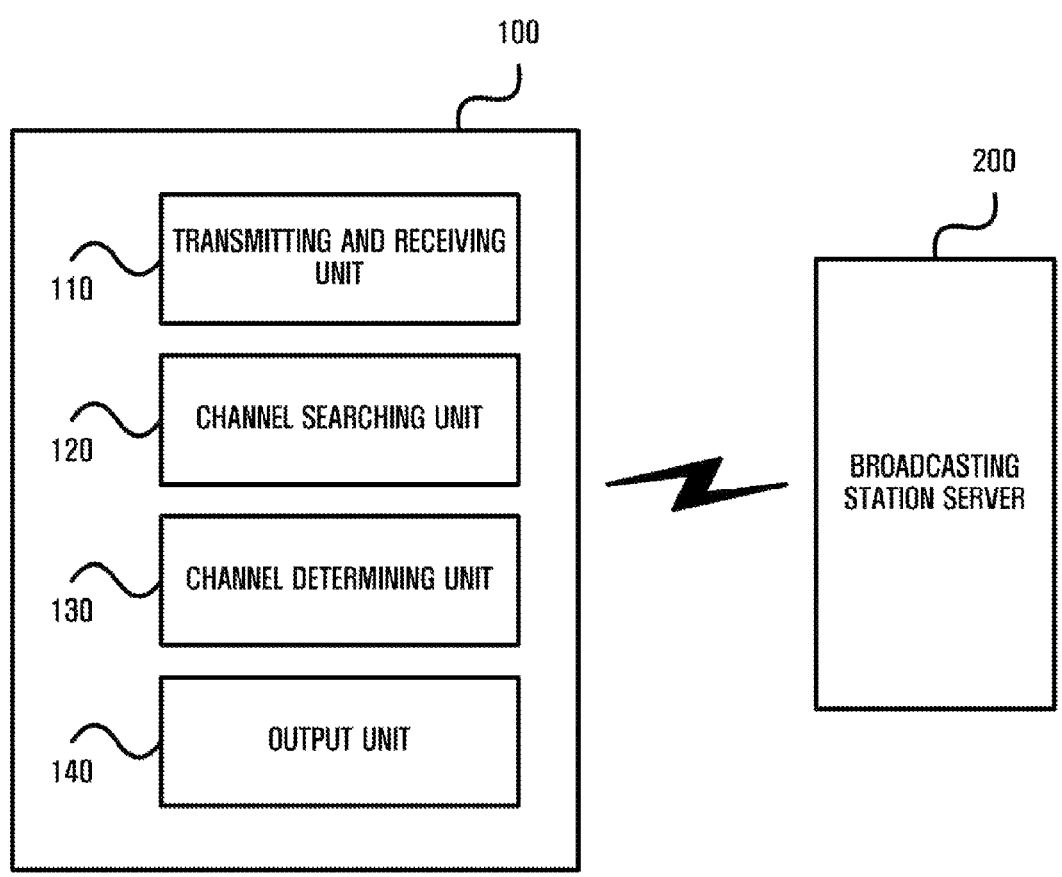
FIG. 4 is a diagram illustrating a structure of an apparatus for transmitting and receiving broadcasting information using reserved channels according to an exemplary embodiment of the present invention.

FIG. 4 is a diagram illustrating a structure of an apparatus for transmitting and receiving broadcasting information using reserved channels according to an exemplary embodiment of the present invention. Generally, a broadcasting receiving apparatus 100 can receive broadcasting signals transmitted by a broadcasting station server 200, and may include a tuner unit, a channel decoding unit, a demultiplexer, an audio processing unit, a video processing unit, a graphic processing unit, an a signal synthesizing unit. A basic broadcasting receiving process of the broadcasting receiving apparatus 100 is as follows.

The user turns on a power supply of the broadcasting receiving apparatus 100 by using a remote controller or input buttons. Then, when the user selects one channel at which the user wants to view a program, the tuner unit selects and outputs only broadcasting signals of a channel, which is selected by the user, among broadcasting signals received through an antenna. Then, the channel decoding unit restores digital signals detected from the broadcasting signals of the selected channel in a packet unit and outputs them to the demultiplexer. From the data that has been restored in a packet unit, the demultiplexer separates audio data, video data, and broadcasting information data into individual bit streams and outputs them. Therefore, after the separated audio data is decoded by the audio processing unit, the audio data is converted into an analog signal and is then output through a speaker. In addition, the separated video data is subjected to signal processes, such as decoding and error correcting processes, by the video processing unit. Then, the signal synthesizing unit synthesizes the decoded video signal and a graphic image signal processed by the graphic processing unit according to the set specification of a display and outputs it through a display unit.

According to a functional structure of the broadcasting receiving apparatus 100 that outputs a broadcasting signal through the above-described process, as shown in FIG. 4, the broadcasting receiving apparatus 100 includes a transmitting and receiving unit 110, a channel searching unit 120, a channel determining unit 130, and an output unit 140. First, when a program schedule including dynamic programs is changed, if a broadcasting station server 200 sets one or more reserved channels and transmits broadcasting signals according to the changed program schedule, the broadcasting receiving apparatus 100 exchanges broadcasting signals with the broadcasting station server 200 through a broadcasting network.

The transmitting and receiving unit 110 receives information of the program schedule including the dynamic programs and information of reserved channels set by the broadcasting station server 200. Further, it is determined on the basis of the information of the program schedule whether a program schedule of a currently broadcasted program is changed or not.

If the channel searching unit 120 searches for one or more reserved channels that can receive broadcasting signals according to a new program schedule that is obtained by changing the original program schedule due to the dynamic programs, the channel determining unit 130 determines whether the searched reserved channel is currently a valid channel.

When it is determined that the searched reserved channel is currently the valid channel, the output unit 140 outputs information of the reserved channel and notifies the user of the information through a pop-up or PIP function. When the user changes the channel according to the notification to the user, the transmitting and receiving unit 110 receives broadcasting signals according to the changed program schedule through the reserved channel.

Meanwhile, the term "unit" used in the exemplary embodiment of the present invention, that is, "module" or "table" means software, or a hardware component such as an Field Programmable Gate Array (FPGA) or an Application Specific Integrated Circuit (ASIC) and the modules each perform assigned functions. However, the modules are not limited to software or hardware. The modules may be configured in an addressable storage medium, or may be configured to run on at least one processor. The functions provided by the components and the modules may be combined into fewer components and modules or may be separated into additional components and modules. Also, the components and the modules can be implemented to execute one or more CPUs in a device.

It will be apparently understood by those skilled in the art that the scope of the method of transmitting and receiving broadcasting information according to the exemplary embodiment of the present invention includes a computer readable recording medium that has recorded therein a program code to allow a computer to execute the method.

Although the present invention has been described in connection with the exemplary embodiments of the present invention, it will be apparent to those skilled in the art that various modifications and changes may be made thereto without departing from the scope and spirit of the present invention. Therefore, it should be understood that the above exemplary embodiments are not limitative, but illustrative in all aspects.

According to the apparatus and method for transmitting and receiving broadcasting information according to the exemplary embodiment of the present invention, the following effects can be achieved.

When a program schedule including dynamic programs having a flexible broadcasting schedule is changed, a user sets one or more reserved channels and can view broadcast programs through a broadcast channel according to a changed program schedule and a broadcasting channel according to an original program schedule.

Further, channels that are created by using multi-mode services or VOD services are used as reserved channels, and a new income model of broadcasting can be created.

What is claimed is:

1. A method of receiving broadcasting information using reserved channels, the method comprising:
   receiving information of a first program schedule comprising a first group of programs including a dynamic program and information regarding reserved channels set by a broadcasting station server, the first group of programs scheduled to be displayed on a main channel according to the first program schedule;
   receiving a first broadcasting signal of the first group of programs on the main channel;
   searching, in response to determining that a program is currently broadcasted according to changed program schedule, at least one reserved channel which receives a second broadcasting signal of a second group of programs scheduled to be displayed on the main channel according to a second program schedule, which is different from the first program schedule due to the dynamic program, and continuously displaying, in response to determining that the program is currently broadcasted according to original program schedule, the first broadcasting signal of the first group of programs on the main channel according to the first program schedule; and
   receiving the second broadcasting signal through the at least one searched reserved channel,
   wherein both of the first broadcasting signal and the second broadcasting signal are received together when the first program schedule is changed so that a user views the first group of programs through the main channel and the second group of programs through the at least one searched reserved channel, and
   wherein the at least one reserved channel is created by a multi-mode service scheme that divides a frequency bandwidth of the main channel which receives the first broadcasting signal for the first program schedule.

2. The method of claim 1, wherein the dynamic program comprises a broadcast program in which one of a start time, an end time, a broadcasting time and a broadcasting order changes.

3. The method of claim 1, wherein the receiving of the information of the first program schedule comprises determining whether the broadcast schedule of the dynamic program is changed, wherein the determining is based on the information of the first program schedule.

4. The method of claim 1, wherein the first broadcasting signal comprises the dynamic program according to the first program schedule and the second broadcasting signal comprises the dynamic program according to the second program schedule.

5. The method of claim 1, wherein information of the at least one reserved channel is received together with the first broadcasting signal.

6. A method of receiving broadcasting information using reserved channels, the method comprising:
   receiving information of a first program schedule comprising a dynamic program having a broadcasting schedule and information regarding reserved channels set by a broadcasting station server;

receiving a first broadcasting signal for the first program schedule on a main channel;

searching, in response to determining that a program is currently broadcasted according to changed program schedule, at least one reserved channel which receives a second broadcasting signal for a second program schedule, which is different from the first program schedule due to the dynamic program, and continuously displaying, in response to determining that the program is currently broadcasted according to original program schedule, the first broadcasting signal of the first group of programs on the main channel according to the first program schedule; and receiving the second broadcasting signal through the at least one searched reserved channel, wherein the searching of the at least one reserved channel comprises:
 determining whether the at least one searched reserved channel is a valid channel; and
 outputting, if it is determined that the at least one searched reserved channel is a valid channel, information of the at least one reserved channel, and notifying a user of the information, and
 wherein both of the first broadcasting signal and the second broadcasting signal are received together when the first program schedule is changed so that a user views the first program schedule through the main channel and the second program schedule through the at least one searched reserved channel, and
 wherein the at least one reserved channel is created by a multi-mode service scheme that divides a frequency bandwidth of the main channel which receives the first broadcasting signal for the first program schedule.

7. The method of claim 6, wherein the information of the at least one reserved channel comprises channel number information and resolution information of the at least one reserved channels, and information of broadcasting programs displayed on the at least one reserved channels.

8. The method of claim 6, wherein the searching of the at least one reserved channel further comprises receiving a command on whether to change a channel of the at least one reserved channel according to the notifying and changing the channel to the reserved channel according to the command.

9. A method of transmitting broadcasting information using reserved channels, the method comprising:

creating a first program schedule comprising a first group of programs including a dynamic program, the first group of programs scheduled to be displayed on a main channel according to the first program schedule;

transmitting a first broadcasting signal of the first group of programs and information regarding reserved channels set by a broadcasting station server to a broadcast receiver through the main channel;

selecting, in response to determining that a program is currently broadcasted according to changed program schedule, at least one reserved channel which transmits a second broadcasting signal of a second group of programs scheduled to be displayed on the main channel according to a second program schedule which is different from the first program schedule due to the dynamic program, and continuously displaying, in response to determining that the program is currently broadcasted according to original program schedule, the first broadcasting signal of the first group of programs on the main channel according to the first program schedule; and transmitting the second broadcasting signal to the broadcasting receiver through the selected at least one reserved channel, wherein both of the first broadcast signal and the second broadcasting signal are transmitted together when the first program schedule is changed so that a user views the first group of programs through the main channel and the second group of programs through the at least one searched reserved channel, and wherein the at least one reserved channel is created by a multi-mode service scheme that divides a frequency bandwidth of the main channel which transmits the first broadcasting signal for the first program schedule.

10. The method of claim 9, wherein the dynamic program comprises a program in which one of a program start time, an end time, a broadcasting time and a broadcasting order changes.

11. The method of claim 9, wherein the first broadcasting signal comprises the dynamic program according to the first program schedule and the second broadcasting signal comprises the dynamic program according to the second program schedule.

12. The method of claim 9, wherein information of the at least one reserved channel is transmitted together with the first broadcasting signal.

13. An apparatus for receiving broadcasting information using reserved channels, the apparatus comprising:

a transmitting and receiving unit which receives information of a first program schedule comprising a first group of programs including a dynamic program and information regarding reserved channels set by a broadcasting station server, the first group of programs being scheduled to be displayed on a main channel according to the first program schedule, and receives a first broadcasting signal of the first group of programs through the main channel; and a channel searching unit which searches for, in response to determining that a program is currently broadcasted according to changed program schedule, at least one reserved channel that receives a second broadcasting signal of a second group of programs scheduled to be displayed on the main channel according to a second program schedule, which is different from the first program schedule due to the dynamic program, wherein the channel searching unit continuously displays, in response to determining that the program is currently broadcasted according to original program schedule, the first broadcasting signal of the first group of programs on the main channel according to the first program schedule, wherein the transmitting and receiving unit receives the second broadcasting signal through the at least one searched reserved channel, and wherein the transmitting and receiving unit receives both of the first broadcasting signal and the second broadcasting signal together when the first program schedule is changed so that a user views the first group of programs through the main channel and the second group of programs through the at least one searched reserved channel, and wherein the at least one reserved channel is created by a multi-mode service scheme that divides a frequency bandwidth of the main channel which receives the first broadcasting signal for the first program schedule.

14. The apparatus of claim 13, wherein the dynamic program comprises a program in which one of a start time, an end time, a broadcasting time and a broadcasting order changes.

15. The apparatus of claim 13, wherein the transmitting and receiving unit determines whether the broadcast schedule of the dynamic program is changed, wherein the determining is based on the information of the first program schedule.

16. The method of claim 13, wherein the first broadcasting signal comprises the dynamic program according to the first program schedule and the second broadcasting signal comprises the dynamic program according to the second program schedule.

17. The apparatus of claim 13, wherein information of the at least one reserved channel is received together with the first broadcasting signal.

18. An apparatus for receiving broadcasting information using reserved channels, the apparatus comprising:
a transmitting and receiving unit which receives information of a first program schedule comprising a dynamic program having a broadcasting schedule and information regarding reserved channels set by a broadcasting station server, and receives a first broadcasting signal according to the first program schedule;
a channel searching unit which searches for, in response to determining that a program is currently broadcasted according to changed program schedule, at least one reserved channel that receives a second broadcasting signal for a second program schedule, which is different from the first program schedule due to the dynamic program, wherein the channel searching unit continuously displays, in response to determining that the program is currently broadcasted according to original program schedule, the first broadcasting signal of the first group of programs on the main channel according to the first program schedule,
wherein the transmitting and receiving unit receives the second broadcasting signal through the at least one searched reserved channel,
a channel determining unit which determines whether the at least one reserved channel is valid; and
an output unit which outputs, if it is determined that the at least one searched reserved channel is valid, information of the at least one reserved channel, and notifying a user of the information, and
wherein the transmitting and receiving unit receives both of the first broadcasting signal and the second broadcasting signal together when the first program schedule is changed so that a user views the first program schedule through the main channel and the second program schedule through the at least one searched reserved channel, and
wherein the at least one reserved channel is created by a multi-mode service scheme that divides a frequency bandwidth of the main channel which receives the first broadcasting signal for the first program schedule.

19. The apparatus of claim 18, wherein the information of the at least one reserved channel comprises channel number information and resolution information of the at least one reserved channel and information of broadcasting programs displayed on the at least one reserved channel.

20. A system for transmitting and receiving broadcasting information using reserved channels, the system comprising:
a broadcasting station server which transmits a first broadcasting signal of a first group of programs scheduled to be displayed on a main channel according to a first program schedule through the main channel, and selects, in response to determining that there is a change in the first program schedule that comprises a dynamic program having a broadcasting schedule which changes, at least one reserved channel, and transmits a second broadcasting signal through the at least one reserved channel, wherein the second broadcasting signal is of a second group of programs scheduled to be displayed the main channel according to a second program schedule, which is different from the first program schedule due to the dynamic program, and wherein the broadcasting station server continuously transmits, in response to determining that the first program schedule is not changed, the first broadcasting signal of the first group of programs on the main channel according to the first program schedule; and
a broadcasting receiver, which receives information regarding reserved channels set by the broadcasting station server and the first broadcasting signal through the main channel and the second broadcasting signal through the at least one reserved channel,
wherein the broadcasting receiver receives both of the first broadcasting signal and the second broadcasting signal together when the first program schedule is changed so that a user views the first group of programs through the main channel and the second group of programs through the at least one searched reserved channel, and
wherein the at least one reserved channel is created by a multi-mode service scheme that divides a frequency bandwidth of the main channel which receives the first broadcasting signal for the first program schedule.

21. The system of claim 20, wherein the broadcasting receiver comprises:
a transmitting and receiving unit receives information of the first program schedule; and
a channel searching unit which searches for the at least one reserved channel,
wherein the transmitting and receiving unit receives the second broadcasting signal through the at least one searched reserved channel.

22. The system of claim 21, wherein the dynamic program comprises a program in which one of a start time, an end time, a broadcasting time and a broadcasting order changes.

23. The system of claim 21, wherein the transmitting and receiving unit determines whether the broadcast schedule of the dynamic program is changed, wherein the determining is based on the information of the first program schedule.

24. The method of claim 20, wherein the first broadcasting signal comprises the dynamic program according to the first program schedule and the second broadcasting signal comprises the dynamic program according to the second program schedule.

25. The system of claim 20, wherein the broadcasting station server transmits information of the at least one reserved channel together with the first broadcasting signal.

26. A system for transmitting and receiving broadcasting information using reserved channels, the system comprising:
a broadcasting station server which selects, if there is a change in a first program schedule that comprises a dynamic program having a broadcasting schedule which changes, at least one reserved channel, and transmits a second broadcasting signal through the at least one reserved channel, wherein the second broadcasting signal comprises a second program schedule, which is different from the first program schedule due to the dynamic program;

a broadcasting receiver, which receives the second broadcasting signal through the at least one reserved channel, wherein the broadcasting receiver comprises:

a transmitting and receiving unit receives information of the first program schedule and information regarding reserved channels set by the broadcasting station server, and receives a first broadcasting signal according to the first program schedule; and a channel searching unit which searches for, in response to determining that a program is currently broadcasted according to changed program schedule, the at least one reserved channel, and continuously displays, in response to determining that the program is currently broadcasted according to original program schedule, the first broadcasting signal of the first group of programs on the main channel according to the first program schedule, wherein the transmitting and receiving unit receives the second broadcasting signal through the at least one searched reserved channel, a channel determining unit determining whether the one or more searched reserved channels are currently valid channels; and an output unit which outputs, if it is determined that the one or more searched reserved channels are currently valid channels, information of the one or more reserved channels, and notifying a user of the information, wherein the broadcasting receiver receives both of the first broadcasting signal and the second broadcasting signal together when the first program schedule is changed so that a user views the first program schedule through the main channel and the second program schedule through the at least one searched reserved channel, and wherein the at least one reserved channel is created by a multi-mode service scheme that divides a frequency bandwidth of the main channel which receives the first broadcasting signal for the first program schedule.

\* \* \* \* \*